United States Patent [19]

Kastl et al.

[11] Patent Number: 5,008,596

[45] Date of Patent: Apr. 16, 1991

[54] FLUORESCENT LAMP HIGH FREQUENCY OPERATING CIRCUIT

[75] Inventors: Roland Kastl, Unterhaching; Ulrich Roll, Munich, both of Fed. Rep. of Germany

[73] Assignee: Patent Treuhand Gesellschaft fur elektrische Glühlampen m.b.H., Munich, Fed. Rep. of Germany

[21] Appl. No.: 276,223

[22] Filed: Nov. 23, 1988

[30] Foreign Application Priority Data

| | | | |
|---|---|---|---|
| Dec. 2, 1987 | [DE] | Fed. Rep. of Germany | 3740860 |
| Oct. 14, 1988 | [DE] | Fed. Rep. of Germany | 3835121 |

[51] Int. Cl.[5] .................... H05B 37/00; H05B 39/04; H05B 41/36; H02M 7/5387

[52] U.S. Cl. ............................ 315/205; 315/DIG. 7; 315/219; 315/206; 315/DIG. 5; 315/290; 363/132; 331/113 A

[58] Field of Search .......... 315/219, DIG. 5, DIG. 7, 315/205, 206, 207, 209 R, 210, 223, 226, 244, 290; 363/123, 131, 132; 331/113 A

[56] References Cited

U.S. PATENT DOCUMENTS

| | | | |
|---|---|---|---|
| 3,019,370 | 1/1962 | Basharrah | 315/206 |
| 4,151,445 | 4/1979 | Davenport et al. | 315/219 |
| 4,430,628 | 2/1984 | Nilssen | 331/113 A |
| 4,553,070 | 11/1985 | Sairanen et al. | 315/209 R |
| 4,647,817 | 3/1987 | Fähnrich et al. | 315/244 |
| 4,677,345 | 6/1987 | Nilssen | 315/219 |
| 4,775,822 | 10/1988 | Statnic et al. | 315/224 |
| 4,782,268 | 11/1988 | Fähnrich et al. | 315/244 |
| 4,806,830 | 2/1989 | Ueki | 315/205 |

FOREIGN PATENT DOCUMENTS

| | | | |
|---|---|---|---|
| 2106339 | 4/1983 | United Kingdom | 315/219 |

OTHER PUBLICATIONS

"Elektronik-Schaltungen", (Electronic Circuits), pp. 147-151, Hirschmann.

*Primary Examiner*—Eugene R. LaRoche
*Assistant Examiner*—Michael B. Shingleton
*Attorney, Agent, or Firm*—Frishauf, Holtz, Goodman & Woodward

[57] ABSTRACT

To provide enhanced starting voltages for fluorescent lamps operating, for example, from 110 V power networks through a rectifier, and in which a high-frequency oscillatory circuit is used which includes a ring core transformer (TR1, TR2, TR3) operated under saturation conditions, and controlling switching transistors (T1, T2), which have emitter-resistors (R4, R5) connected thereto to stabilize the operation of the circuit and of the transistors, at least one diode (FIG. 4: D4, D5) is connected in parallel to at least one of the emitter resistors; for some circuits (FIGS. 2-4) a diode, or two diodes (D6, D7, D8, D9) can form the emitter-resistors or resistors.

15 Claims, 2 Drawing Sheets

FLUORESCENT LAMP HIGH FREQUENCY OPERATING CIRCUIT

Reference to related patents, assigned to the assignee of the present application, the disclosure of which is hereby incorporated by reference:

U.S. Pat. No. 4,647,817

U.S. Pat. No. 4,775,822, Statnic et al. (based on U.S. Ser. No. 07/048,005, filed May 9, 1987).

Reference to related patent, the disclosure of which is hereby incorporated by reference:

U.S. Pat. No. 4,553,070, Sairanen.

Other reference:

Siemens Aktiengesellschaft publication "Elektronikschaltungen" ("Electronic Circuits"), by Walter Hirschmann, Berlin/Munich, 1982, pp. 147-151. having network voltages in the order of 110 V.

BACKGROUND

The book published by Siemens AG, "Elektronikschaltungen" ("Electronic Circuits"), article by W. Hirschmann, page 148, shows a suitable circuit for operating fluorescent lamps from a-c power networks by rectifying the received a-c network power and converting it to high frequency, to obtain more efficient light output upon operation of the fluorescent lamp. The circuit as known, as well as the circuit of the present invention, is not restricted to operating only a single fluorescent lamp; the circuits can operate also a plurality of fluorescent lamps, connected in parallel or in series. If operated in parallel each one of the fluorescent lamps will have an individual resonant circuit associated therewith.

The circuits to generate the high frequency use switching transistors. The switching transistors are so connected that the emitters have emitter resistors serially connected thereto, the emitter-resistors having a value of from about 0.5 to 5 ohms. These emitter-resistors, which are connected to each one of the switching transistors, are used to compensate for differences in individual characteristics of transistors, to stabilize the thermal operation of the transistors and, in some instances, to permit adjustment of the operating power being supplied to the fluorescent lamp with which the circuit is used. The resistors, through which the emitter current flows, result in localized current inverse feedback. This inverse feedback reduces the current amplification of the transistors and, for a given base drive of the transistors, limits the maximum current which can flow therethrough, that is, the maximum generated current of the oscillator and thus also the maximum voltage which can be generated by resonant voltage amplification.

Some types of lamps require substantial ignition voltages. It is frequently difficult and sometimes impossible to obtain a sufficiently high generator voltage to ensure reliable firing or ignition of the lamps without additional substantial circuitry in the starting and operating circuit. These difficulties are particularly noticeable when the lamps are to be operated from power networks of nominally 100 to 120 V. The voltage enhancement over the nominal voltage to ensure reliable ignition of the lamps, and hence starting of the lamps, must be greater than when the lamps are operated from higher voltage networks.

U.S. Pat. No. 4,553,070 describes a circuit in which, in series to the emitters, diodes are connected which have the purpose to increase the time during which both transistors are OFF by providing a threshold value which has to be exceeded by the drive voltage. This increases the gap between conduction of the respective transistors, and prevents the flow of stray or cross currents.

THE INVENTION

It is an object to provide a lamp high frequency operating circuit combination, and more particularly a high frequency operating circuit for fluorescent lamps, which is so arranged that stable continuous operation can be readily obtained while, further, higher ignition voltages can be generated, using only a minimum of circuit components, specifically reliable well known circuit components, and without eliminating the advantages obtained by using emitter resistors in the emitter circuits of the switching transistors.

Briefly, the emitter-resistor circuit of at least one of the switching transistors, in accordance with the invention, is modified by connecting in circuit with the emitter-resistor one or more diodes which are poled to pass the emitter current. The diode or diodes can be connected in parallel with the emitter-resistors; by proper selection thereof, they may replace the emitter-resistors so that the inherent diode resistance forms the emitter-resistors.

The connection of the diodes in the emitter circuit, and particularly parallel connection of the diodes, has the advantage that the output peak currents which can be obtained from the rectifier circuit are substantially increased without, for normal operation, sacrificing the advantages of the stabilizing effect of current feedback which is due to the emitter-resistors. Upon continued operation, that is, during normal operation of the lamp, the voltage drop at the respective emitter-resistors will be below the voltage at which current will flow through the diode, that is, below the abrupt change in the voltage-current characteristics of the diode. Consequently, hardly any current will flow through the diode, and the effect of the resistor in the emitter circuit will not be impaired, in other words, the emitter resistor can contribute to stable operation, temperature compensation, compensation for variations in transistor characteristics and setting of the operating power of the lamps. Yet, when high current is needed, for example upon first firing or lighting of the lamp, the-voltage at the emitter-resistor will rise so that the diode becomes conductive, or of very low resistance, and in effect essentially eliminates the current inverse feedback. Thus, the transistors will provide substantially higher output currents under those conditions.

By suitable dimensioning of the respective circuit elements, it is also possible to connect suitably selected diodes in series to the emitters of the switching transistors, poled in current passing direction with respect to the emitter current. These diodes then will have the effect of the diode current carrying capability as well as of the emitter-resistors. In normal current lamp operation, a portion of the diode voltage-current characteristics is used which is substantially flatter than that which is used during firing or ignition; upon firing or ignition, a substantially lower dynamic resistance of the diodes will be effective.

Increased output peak currents can still be obtained by using only one diode in parallel to the emitter-resistor of one of the transistors, or to replace the emitter-resistor of one of the transistors. Such an arrangement decreases the manufacturing costs since, for such a circuit arrangement, one less diode is required.

The diodes have an effect which differs from that described in the aforementioned U.S. Pat. No. 4,553,070. If the circuit utilizes transformers which are controlled to operate into saturation, and particularly when using a saturable toroidal core transformer, the circuit as described in the aforementioned U.S. Pat. No. 4,553,070 is not needed. When using transformers, and especially saturable toroidal core transformers switched into saturation, the problems which are solved by the diodes of the aforementioned U.S. Pat. No. 4,553,070 do not arise.

If voltages for current passage of less than 0.7 V are required, the diodes, preferably are commercial Schottky diodes. When higher voltages are needed, preferably one or a plurality of series connected silicon diodes are used. Drawings, showing illustrative embodiments of the present invention:

FIG. 1 is an exact circuit diagram of a circuit in accordance with the present invention for operating a compact fluorescent lamp; and FIGS. 2, 3 and 4 are fragmentary diagrams of circuit portions within the block shown by the broken line A of FIG. 1.

DETAILED DESCRIPTION

Figure 1:
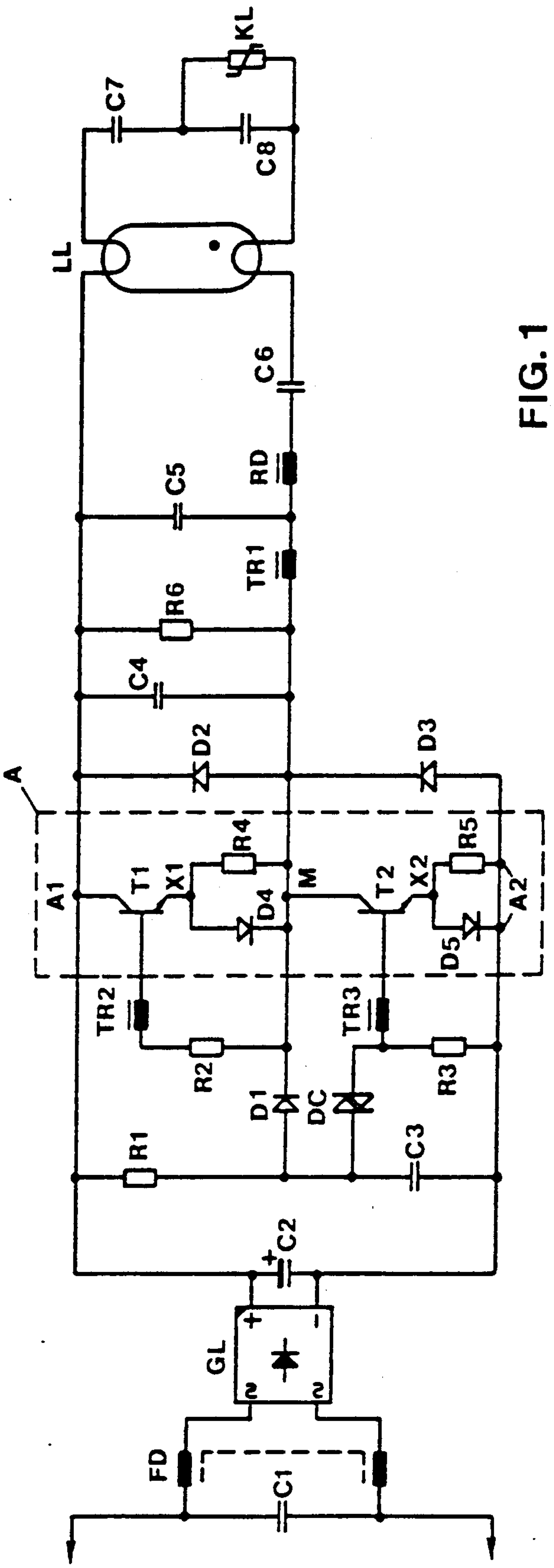

Power is received at alternating current frequencies from a power network and applied first across a capacitor C1, acting as a filter capacitor. Each one of the power conductors is then connected through a filter choke FD, which is a noncurrent compensated choke. Choke and capacitor form, essentially, a high frequency filter. The output from the high frequency filter is connected to a rectifier GL. The output from the rectifier GL, which can be a standard bridge rectifier for example, is connected across the terminals of a capacitor C2.

High frequency is obtained from the direct current outputs across the capacitor C2 by a self-controlled push-pull frequency generator, formed of two equally polarized transistors T1, T2. Return current diodes D2 and D3 are connected across the main current paths of the transistors. A control transformer having windings TR1, TR2, TR3 provides feedback through base resistors R2, R3 to the bases; a breakdown diode or diac DC is connected, also, to the base of one of the transistors, as shown to the transistor T2. Capacitor resistance network R1, C3, and network R6, C4, as well as the diode D! and the diac DC together complete the oscillatory circuit including the transistors T1, T2. The transformer with windings TR1, TR2, TR3, which are all on a single toroidal core operates on the basis of saturation.

Transistor T1 has its emitter connected to an emitter terminal X1 and through a resistor R4 to a main terminal M, forming an output terminal of the oscillator. Transistor T2 has its emitter terminal X2 connected through a resistor R5 and through a diode D3 to the main terminal M.

In accordance with a feature of the invention, a diode D4 is connected in parallel with the resistor R4; and a diode D5 is connected in parallel with the resistor R5. In normal operation of the lamp, the voltage across the resistors R4, R5, respectively, is below the voltage at which the diodes D4, D5 conduct, so that current feedback is obtained thereby. Under conditions of high current demand, that is for example under starting conditions of the lamp, current can, however, additionally flow through the diodes D4, D5, respectively, which are polarized in current passing connection.

The discharge lamp LL, typically a fluorescent lamp, has one terminal of its first filament connected to the positive terminal of the network rectifier GL. One terminal of the second filament is coupled through the capacitor C6 and a resonance choke RD, and a primary winding TR1 to the main junction M, forming the main or center terminal between the transistors T1, T2. The series resonance circuit additionally includes two capacitors C7, C8 which are connected in the heating circuit of the lamp. A PTC resistor KL is connected in parallel to the capacitor C8. Additionally, a capacitor C5 is connected to the junction between the transformer winding TR1 and the resonance choke winding RD and the first terminal of the first filament of the lamp LL.

OPERATION

The basic operation of the circuit and of the series resonance circuit to operate the fluorescent lamp is described, for example, in the referenced publication, that is, the book by Hirschmann, page 147. In brief, the transistors T1, T2 supply essentially a square wave output voltage at the terminal M. The inductance RD, together with the capacitor network C7, C8, forms an oscillatory circuit, from which a high sinusoidal voltage is obtainable. After ignition, the voltage drops to the operating voltage of the lamp, and the heater current of the lamp also is reduced. The precise operation of the ignition circuit, formed by the capacitors C7, C8 and the pTC resistor KL, is described in the referenced U.S. Pat. No. 4,647,817, assigned to the assignee of the present application, and the disclosure of which is incorporated hereby by reference. The capacitor C5, in combination with the resonance choke RD, forms an additional series resonant circuit which ensures increase of the lamp supply voltage, as described in detail in the referenced U.S. Pat. No. 4,775,822, based on application Ser. No. 07/048,005 of May 9, 1987, Statnic et al, and assigned to the assignee of the present application, the disclosure of which is hereby incorporated by reference.

Suitable circuit elements for a circuit in accordance with the present invention to operate a compact fluorescent lamp LL of 20 W from a network voltage of 120 V are as follows:

| | |
|---|---|
| C1 | 47 nF |
| FD | radio noise suppression choke 2 × 28 mH |
| GL | B 250, C 800 |
| C2 | electrolytic capacitor 47 μF/200 V |
| R1, R6 | 330 kΩ |
| C3 | 100 nF/100 V |
| D1 | 1N4004 |
| DC | diac, trigger voltage 33 V |
| TR1, TR2, TR3 | ring core transformer R 10 × 6 × 4<br>n1 = 5 turns, n2 = n3 = 4 turns |
| R2, R3 | 12Ω |
| D2, D3 | BA 157 |
| R4, R5 | 1.5Ω |
| D4, D5 | RGP 10 |
| T1, T2 | BUW 41 |
| C4 | 1 nF |
| C5, C8 | 4.7 nF |
| RD | EF 16, 1.5 mH |
| C6 | 22 nF |
| C7 | 6.8 nF |
| KL | PTC resistor C 890. |

The two diodes D4, D5, connected in parallel to the resistors R4, R5 permit increasing the generator voltage of the half-bridge circuit, in resonance mode by more than 50%.

Power for the lamp LL is, basically, derived from the circuit within the broken line A, including the transistors T1, T2 and associated circuit elements.

Figure 2:
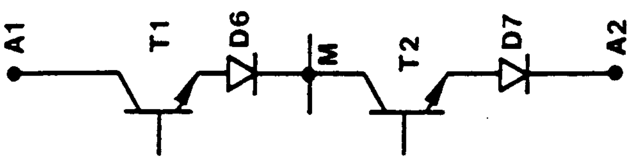

FIG. 2 illustrates a modification of the circuit portion within the broken line A of FIG. 1. Rather than connecting the diodes D4, D5 in parallel with the resistors R4, R5 to form the emitter circuits for the transistors T1, T2, the emitter resistors for the switching transistors T1, T2 are both replaced by diodes D6, D7. The connecting terminals of the circuit are shown at A1, A2 and M.

Figure 3:
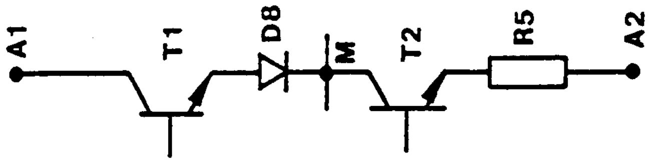
Figure 4:
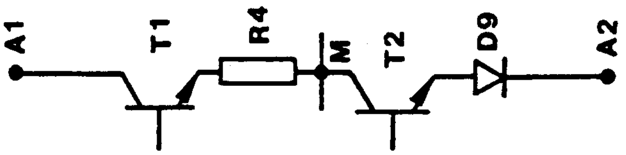

In accordance with another embodiment of the invention, as illustrated in FIGS. 3 and 4, the emitter-resistors of one of the transistors, T1 or T2, are replaced by respective diodes D8, D9. Thus, as seen in FIG. 3, the emitter-resistor for transistor T1 is formed only by the diode D8, whereas the emitter-resistor of transistor T2 includes merely the resistor R5.

FIG. 4 shows, in comparison to FIG. 3, that it does not matter which one of the resistors T1, T2 has the serially connected diode; thus, in FIG. 4, switching transistor T1 has the emitter-resistor R4 serially connected to the emitter-collector path, whereas the transistor T2 has a diode D9 connected serially in the collector-emitter path.

Various changes and modifications may be made, and any features described herein may be used with any of the others, within the scope of the inventive concept.

We claim:

1. For combination with a low-pressure discharge lamp (LL), an operating circuit for high-frequency operation of the lamp, said operating circuit comprising a power network rectifier (GL) for providing d-c output electrical energy;

a self-excited half-bridge oscillating circuit comprising an emitter current supply terminal (M; A2) for each of said transistors;

a toroidal core transformer (TR1, TR2, TR3), said transistors being connected to the toroidal core transformer to form an inductively coupled oscillatory circuit and, in operation, causing said toroidal core transformer to operate in saturated condition;

base resistors (R2, R3) connected to the respective bases of the transistors and to the respective emitter current supply terminal (M, A2) of the respective transistor (T1, T2);

a trigger circuit (DC) for starting of the oscillating circuit; and an emitter circuit connected to the respective emitters of the transistors (T1, T2) and to the respective current supply terminal of the respective transistor to provide current feedback therefor, a circuit means generating enhanced ignition voltages for the lamp and to ensure reliable starting and subsequent stable continuous operation, said circuit means consisting of a diode means (D6, D7) in the emitter circuits of each of said switching transistors, said diode means being poled in current passing direction with respect to current flow through the emitter and connected between the emitter and the respective emitter current supply terminal of said at least one transistor to thereby enhance, during starting conditions of the lamp, resonance current flow through the oscillatory circuit including said toroidal core transformer operated in saturation level condition.

2. The combination of claim 1, wherein said diode means comprises Schottky diodes.

3. The combination of claim 1, wherein said diode means comprises silicon diodes.

4. For combination with a low-pressure discharge lamp (LL), an operating circuit for high-frequency operation of the lamp, said operating circuit comprising a power network rectifier (GL) for providing d-c output electrical energy;

a self-excited half-bridge oscillating circuit comprising an emitter current supply terminal (M; A2) for each of said transistors;

a toroidal core transformer (TR1, TR2, TR3), said transistors being connected to the toroidal core transformer to form an inductively coupled oscillatory circuit and, in operation, causing said toroidal core transformer to operate in saturated condition;

base resistors (R2, R3) connected to the respective bases of the transistors and to the respective emitter current supply terminal (M, A2) of the respective transistor (T1, T2);

a trigger circuit (DC) for starting of the oscillating circuit; and an emitter circuit connected to the respective emitters of the transistors (T1, T2) and to the respective current supply terminal of the respective transistor to provide current feedback therefor, a circuit means generating enhanced ignition voltages for the lamp and to ensure reliable starting and subsequent stable continuous operation, said circuit means including in the emitter circuits of each said transistors an emitter resistor (R4, R5) and at least one diode means (D4, D5), connected in parallel with at least one of said emitter resistors (R4, R5), said diode means being poled in current passing direction with respect to current flow through the emitter and connected between the emitter and the respective emitter current supply terminal of said at least one transistor to thereby enhance, during starting conditions of the lamp, resonance current flow through the oscillatory circuit including said toroidal core transformer operated in saturation level condition.

5. The combination of claim 4, wherein the emitter circuits of each of said transistors include an emitter-resistor (R4, R5); and wherein the diode means includes two diodes (D4, D5), each connected in parallel with a respective emitter-resistor (R4, R5).

6. The combination of claim 5, wherein said diode means comprises Schottky diodes.

7. The combination of claim 5, wherein said diode means comprises silicon diodes.

8. The combination of claim 4, wherein said diode means comprises Schottky diodes.

9. The combination of claim 4, wherein said diode means comprises silicon diodes.

10. For combination with a low-pressure discharge lamp (LL), an operating circuit for high-frequency operation of the lamp, said operating circuit comprising a power network rectifier (GL) for providing d-c output electrical energy;

a self-excited half-bridge oscillating circuit comprising an emitter current supply terminal (M; A2) for each of said transistors;

a toroidal core transformer (TR1, TR2, TR3), said transistors being connected to the toroidal core transformer to form an inductively coupled oscillatory circuit and, in operation, causing said toroidal core transformer to operate in saturated condition;

base resistors (R2, R3) connected to the respective bases of the transistors and to the respective emitter current supply terminal (M, A2) of the respective transistor (T1, T2);

a trigger circuit (DC) for starting of the oscillating circuit; and an emitter circuit connected to the respective emitters of the transistors (T1, T2) and to the respective current supply terminal of the respective transistor to provide current feedback therefor, a circuit means generating enhanced ignition voltages for the lamp and to ensure reliable starting and subsequent stable continuous operation, said circuit means comprising a resistor (R4, R5) in the emitter circuit for one of said transistors and a diode means (D8, D9) in the emitter circuit of the other transistor, said diode means being poled in current passing direction with respect to current flow through the emitter and connected between the emitter and the respective emitter current supply terminal of said at least one transistor to thereby enhance, during starting conditions of the lamp, resonance current flow through the oscillatory circuit including said toroidal core transformer operated in saturation level condition.

11. The combination of claim 10, wherein the emitter circuit of the other transistor consists solely of a diode (D8, D9).

12. The combination of claim 11, wherein said diode means comprises a Schottky diode.

13. The combination of claim 11, wherein said diode means comprises silicon diode.

14. The combination of claim 10, wherein said diode means comprises Schottky diodes.

15. The combination of claim 10, wherein said diode means comprises silicon diodes.

* * * * *